(12) United States Patent
Lee et al.

(10) Patent No.: US 12,070,984 B1
(45) Date of Patent: Aug. 27, 2024

(54) STABILIZER BAR DISCONNECT (71) Applicant: Schaeffler Technologies AG & Co. KG, Herzogenaurach (DE)

(72) Inventors: Brian Lee, Charlotte, NC (US); Michael Hodge, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/221,901

(22) Filed: Jul. 14, 2023

(51) Int. Cl.
*B60G 21/055* (2006.01)

(52) U.S. Cl.
CPC .... *B60G 21/0556* (2013.01); *B60G 2202/135* (2013.01); *B60G 2202/422* (2013.01); *B60G 2204/4191* (2013.01)

(58) Field of Classification Search
CPC ............ B60G 21/0553; B60G 21/0556; B60G 2202/135; B60G 2202/42; B60G 2202/422; B60G 2202/44; B60G 2202/441; B60G 2202/442; B60G 2204/419; B60G 2204/4191
See application file for complete search history.

(56) References Cited

U.S. PATENT DOCUMENTS

| | | | |
|---|---|---|---|
| 6,428,019 B1 | 8/2002 | Kincad et al. | |
| 6,533,294 B1 | 3/2003 | Germain et al. | |
| 7,293,780 B2 | 11/2007 | Germain et al. | |
| 7,748,720 B2 | 7/2010 | Germain | |
| 7,862,052 B2 | 1/2011 | Germain | |
| 8,109,522 B2 | 2/2012 | Pinkos | |
| 9,868,351 B2 | 1/2018 | Cooper | |
| 10,234,009 B2 | 3/2019 | Imafuku | |
| 2006/0017251 A1* | 1/2006 | Taneda | B60G 17/019 280/124.106 |
| 2007/0137408 A1* | 6/2007 | Lassiter | B62K 21/26 74/551.8 |
| 2009/0058020 A1* | 3/2009 | Ersoy | B60G 21/0556 280/5.511 |
| 2011/0006493 A1* | 1/2011 | Pinkos | B60G 17/0162 280/5.508 |
| 2015/0114786 A1* | 4/2015 | Seidl | F16D 27/118 192/66.1 |
| 2016/0089951 A1* | 3/2016 | Jeon | B60G 21/0556 280/5.508 |
| 2016/0290412 A1* | 10/2016 | Quehenberger | F16D 11/16 |
| 2019/0184784 A1* | 6/2019 | Park | B60G 21/0556 |
| 2021/0061052 A1* | 3/2021 | Kim | B60G 17/0165 |
| 2023/0060076 A1* | 2/2023 | Kraus | B60G 21/0556 |
| 2023/0249714 A1* | 8/2023 | Shono | B62D 5/046 701/23 |

FOREIGN PATENT DOCUMENTS

| | | | |
|---|---|---|---|
| EP | 0524607 A1 * | 1/1993 | |
| GB | 2220625 A | 1/1990 | |
| GB | 2309504 A | 7/1997 | |

* cited by examiner

*Primary Examiner* — Jason D Shanske
*Assistant Examiner* — Daniel M. Keck (57) ABSTRACT

A stabilizer bar includes a first housing configured to be fixed to a first side-bar, and a second housing configured to be fixed to a second side-bar. The first housing incudes a clutch piston that engages a clutch ring fixed to the second housing. The clutch piston is moved axially via a screw actuated by a nut. The nut is rotated via a planetary gearset driven by an actuator.

20 Claims, 8 Drawing Sheets

STABILIZER BAR DISCONNECT

TECHNICAL FIELD

The disclosure concerns a stabilizer bar for a vehicle. More particularly, the disclosure concerns a stabilizer bar which can be disconnected for improved off-road performance.

BACKGROUND

Many modern vehicle suspensions include stabilizer bars. Stabilizer bars can equalize a vertical movement of the left and right wheels relative to the vehicle frame or body. However, in some situations it can be desirable to have large vertical movement of a wheel on one side of the vehicle without a corresponding vertical movement on the other side. Independent movement of left and right wheels is helpful for keeping wheels on the ground and providing clearance over obstacles.

SUMMARY

An example embodiment of a vehicle stabilizer bar includes a first housing configured to be fixed to a first side-bar and a second housing disposed within the first housing and configured to be fixed to a second side-bar. The first housing defines a first portion of a first coupling. A clutch piston is disposed within the first housing and defines a second portion of the first coupling and a first portion of a second coupling. The first and second portions of the first coupling cooperate with each other to: i) torsionally couple the clutch piston to the first housing, and ii) provide for axial movement between the clutch piston and the first housing.

In an example embodiment, a clutch ring defines a second portion of the second coupling and is fixed to the second housing. The first and second portions of the second coupling cooperate with each other to selectively torsionally couple the first housing to the second housing.

In an example embodiment, a screw assembly includes a nut disposed within the second housing and the nut is drivably connected to the screw and the screw is coupled to the clutch piston.

In an example embodiment, an actuator is configured to rotate a nut so that the screw moves axially to selectively move the clutch piston from a first connected position, in which the clutch piston is torsionally coupled to the clutch ring, to a second disconnected position, in which the clutch piston is torsionally uncoupled from the clutch ring.

In an example embodiment, the first coupling continuously couples the first housing to the clutch piston.

In an example embodiment, the screw moves axially along an actuation axis without rotating about the actuation axis.

In an example embodiment, the first portion of the second coupling includes an array of protrusions arranged on an axial face of the clutch piston, and the second portion of the second coupling includes an array of depressions arranged on an axial face of the clutch ring. The array of depressions is configured to receive the array of protrusions.

In an example embodiment, the actuator can be an electric motor that is disposed within the second housing. An output shaft of the electric motor can be: i) fixed to a sun gear of a planetary gearset, and ii) concentric with the nut.

In an example embodiment, the vehicle stabilizer bar includes an actuator and a gearset arranged within the second housing and the actuator is drivably connected to the nut via the gearset. The gearset can be a planetary gearset and can engage an internal gear of the nut.

An example embodiment of a vehicle stabilizer bar includes first and second housings. An axially movable clutch piston is torsionally attached to the first housing. A force generator arranged within the first housing is configured to forcibly engage the clutch piston. A clutch ring is fixed to an actuating end of the second housing. A nut is arranged in a fixed axial position within the second housing and is drivably connected to a screw. In a first connected position, the clutch piston is torsionally coupled with the clutch ring via a first axial position of the screw. In the second disconnected position, the clutch piston is torsionally uncoupled with the clutch ring via a second axial position of the screw.

In an example embodiment, the nut is drivably connected to the screw via a plurality of balls.

In an example embodiment, an end of the nut includes an internal gear configured to be driven by the actuator.

In an example embodiment, in the second disconnected position, the second housing rollably engages the first housing.

In an example embodiment, the nut and the screw are disposed within the first housing and the second housing.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
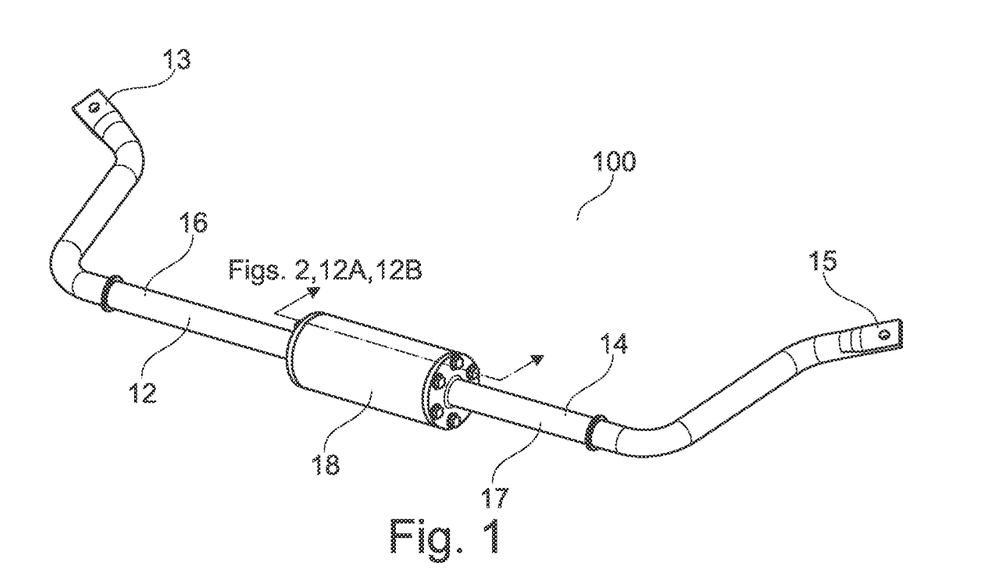
FIG. 1 is a perspective view of an exemplary stabilizer bar with a disconnect unit.
Figure 2:
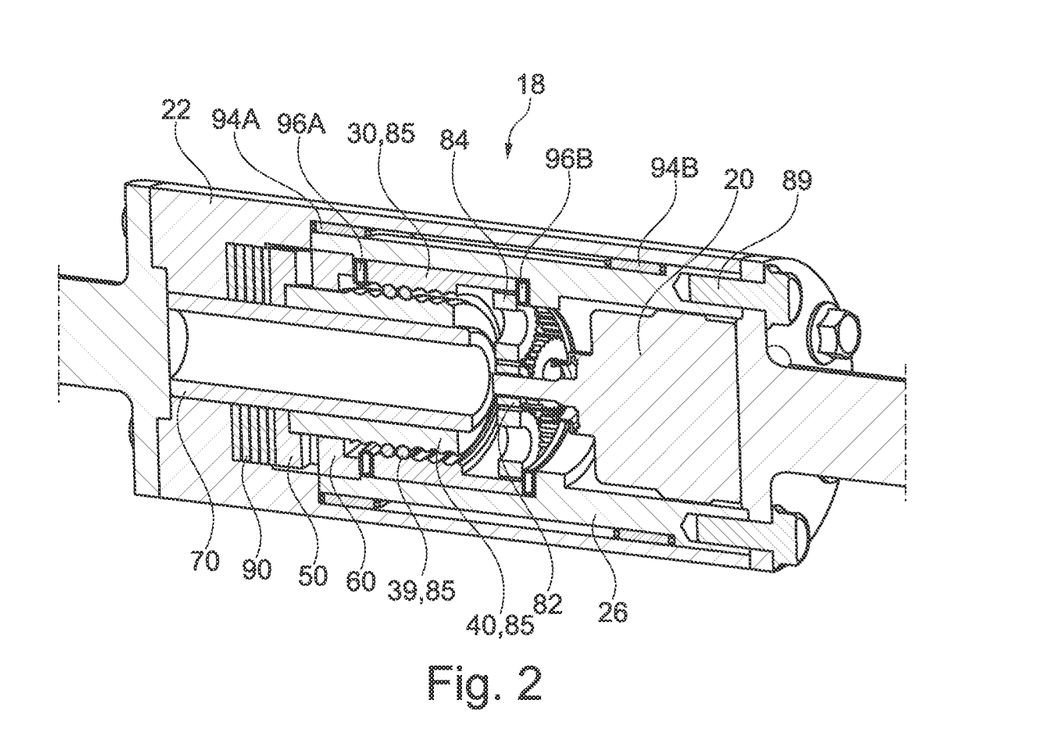
FIG. 2 is a perspective cross-sectional view taken from FIG. 1
Figure 3:
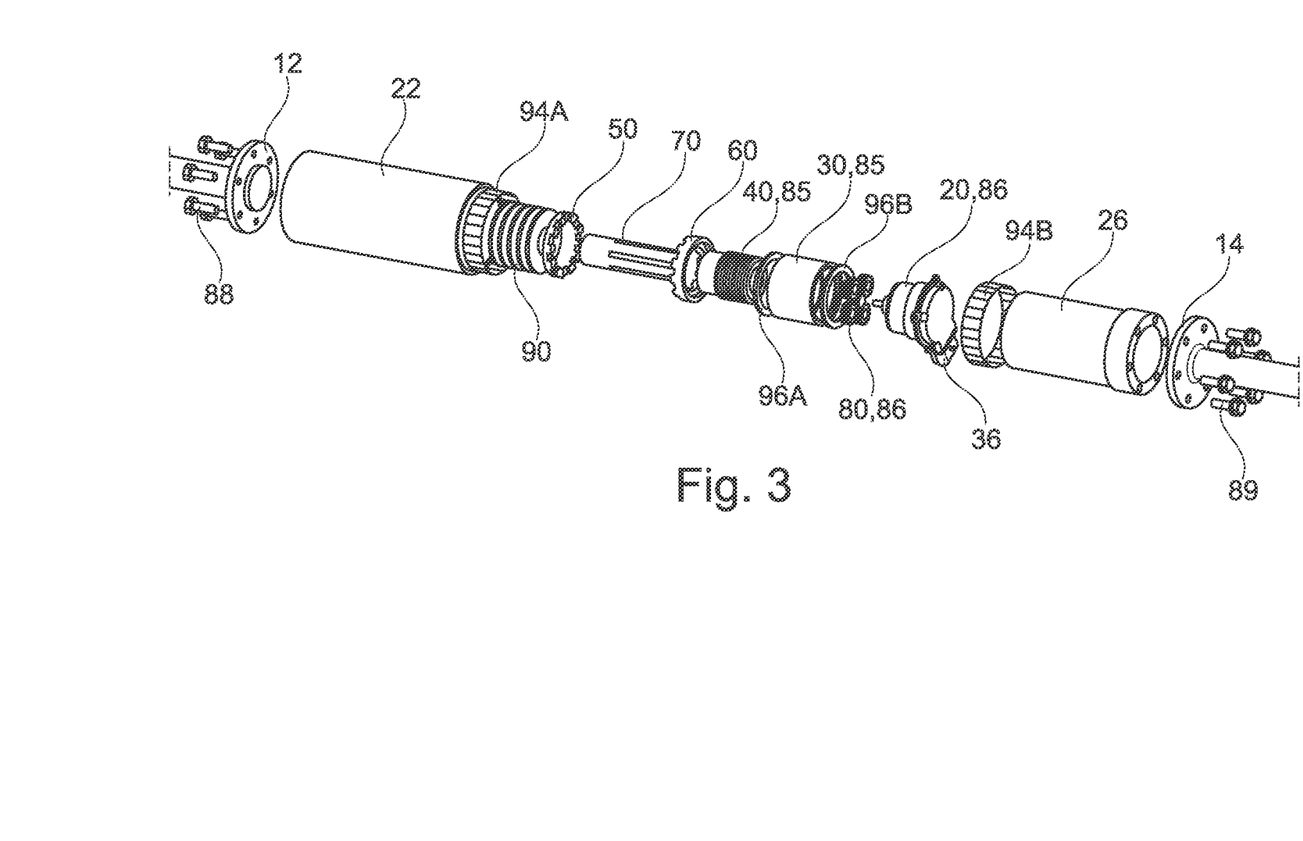
FIG. 3 is an exploded perspective view of the disconnect unit of FIG. 1.
Figure 4A:
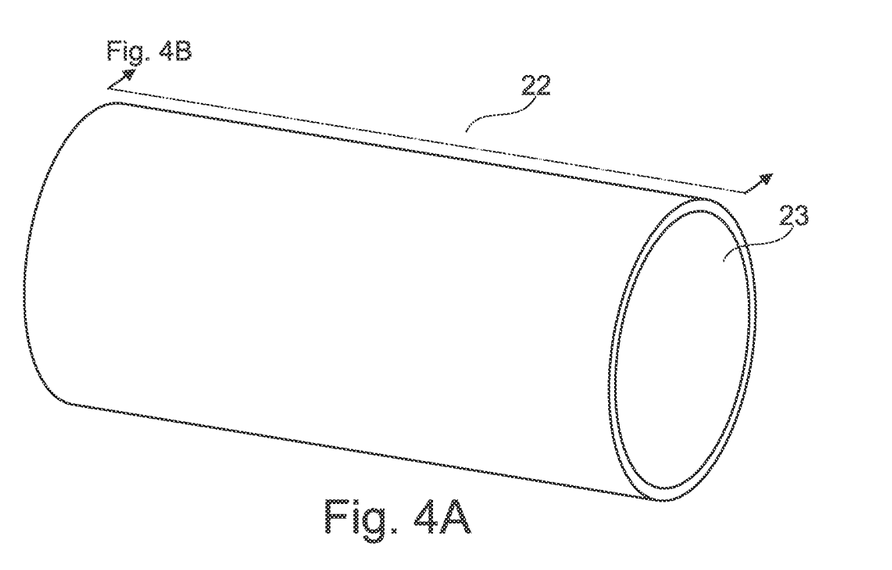
FIG. 4A is a perspective view of a first housing of the disconnect unit of FIG. 1.
Figure 4B:
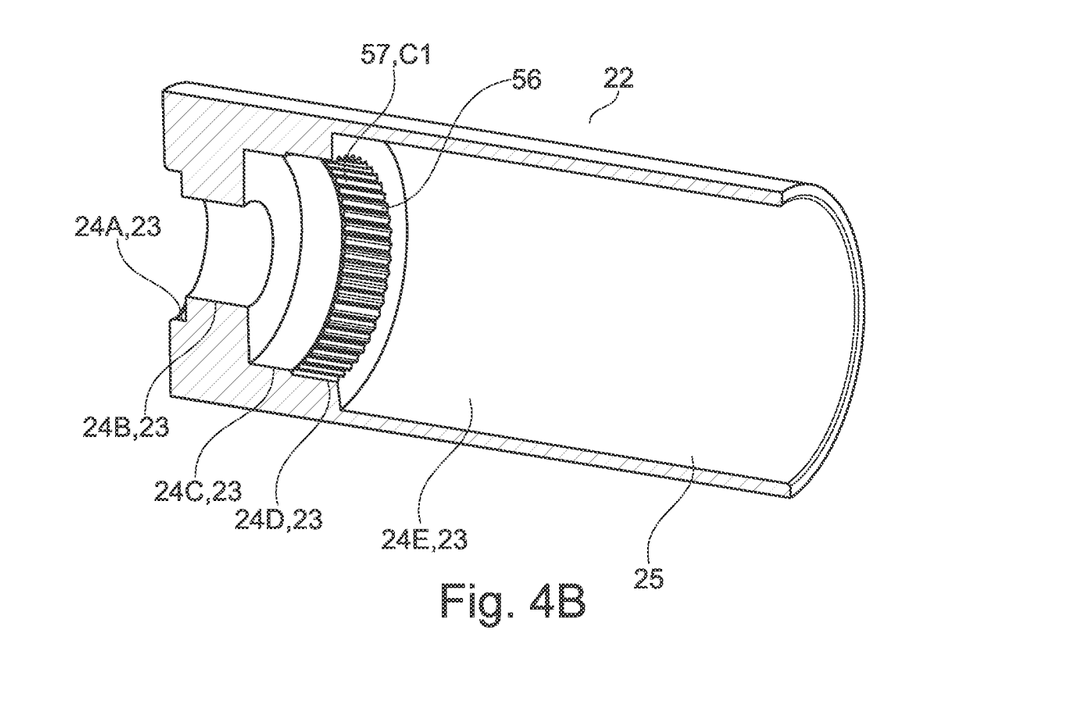
FIG. 4B is a perspective cross-sectional view taken from FIG. 4A.
Figure 5A:
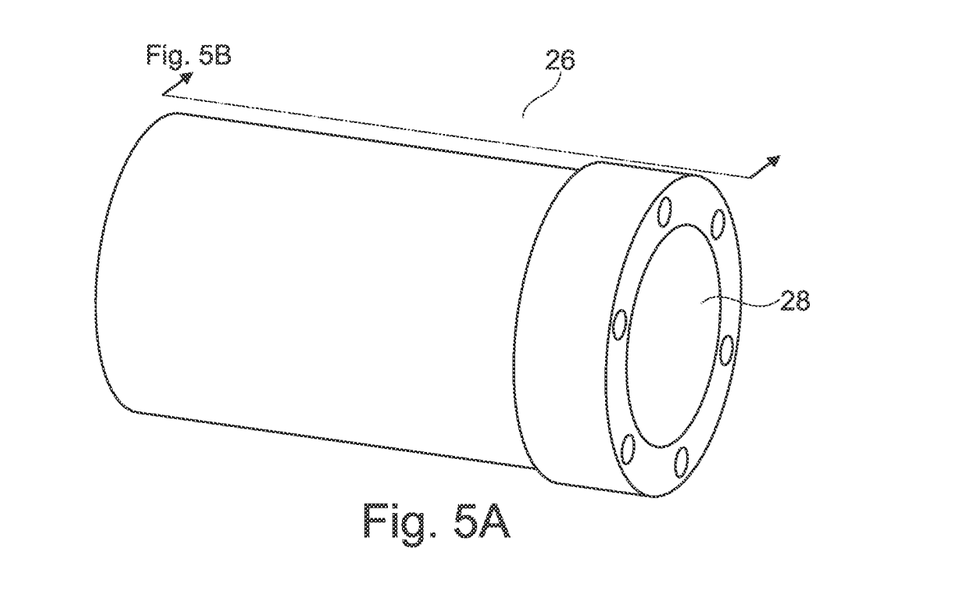
FIG. 5A is a perspective view of a second housing of the disconnect unit of FIG. 1.
Figure 5B:
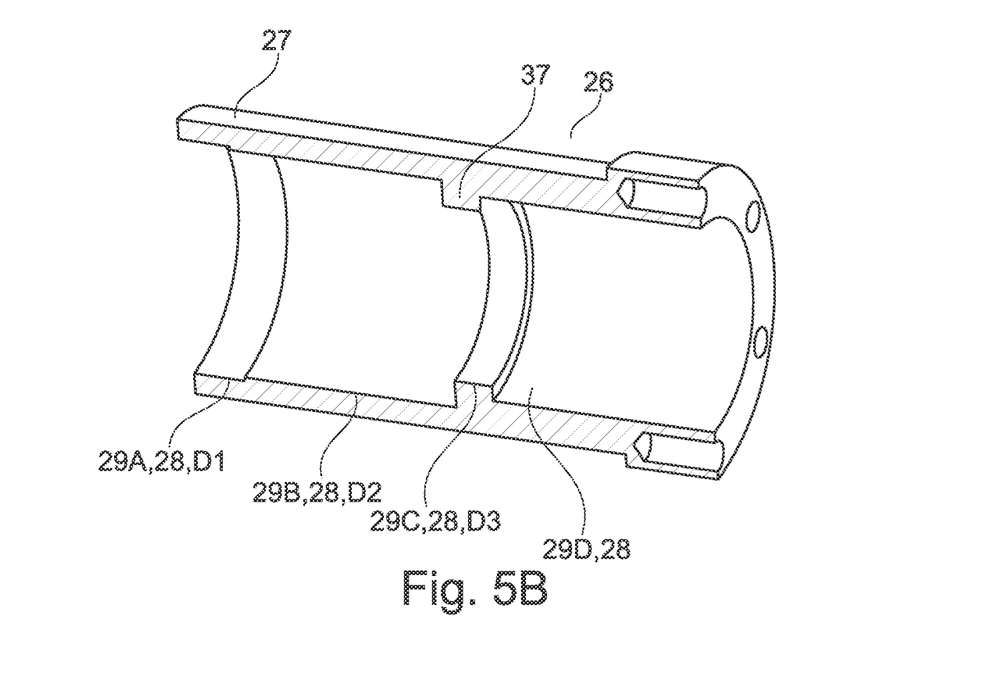
FIG. 5B is a perspective cross-sectional view taken from FIG. 5A.
Figure 6A:
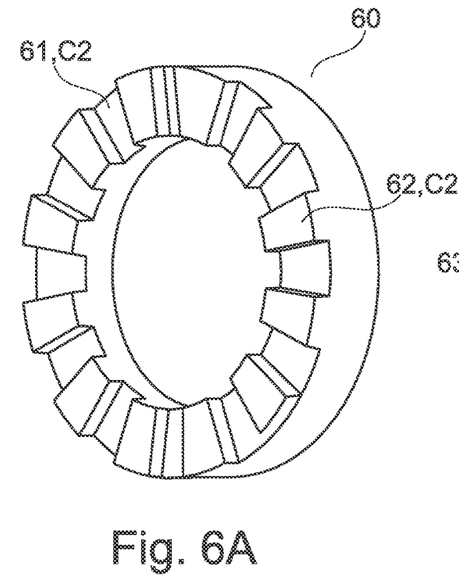
FIG. 6A is a perspective view of a clutch ring of the disconnect unit of FIG. 1.
Figure 6B:
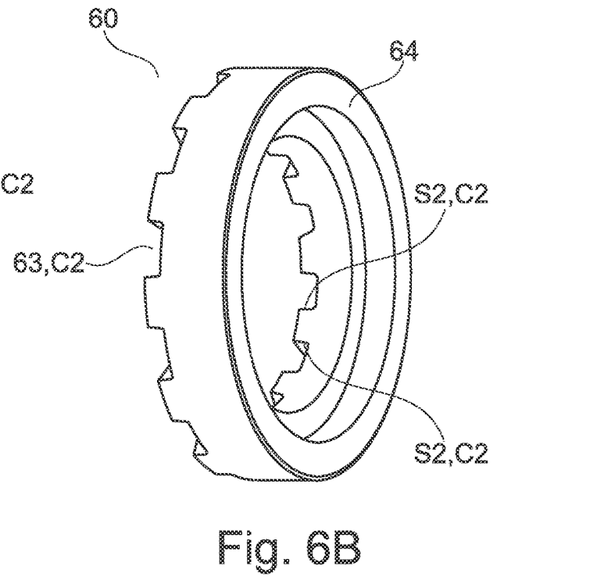
FIG. 6B is a perspective view of a clutch ring of the disconnect unit of FIG. 1.
Figures 7, 8:
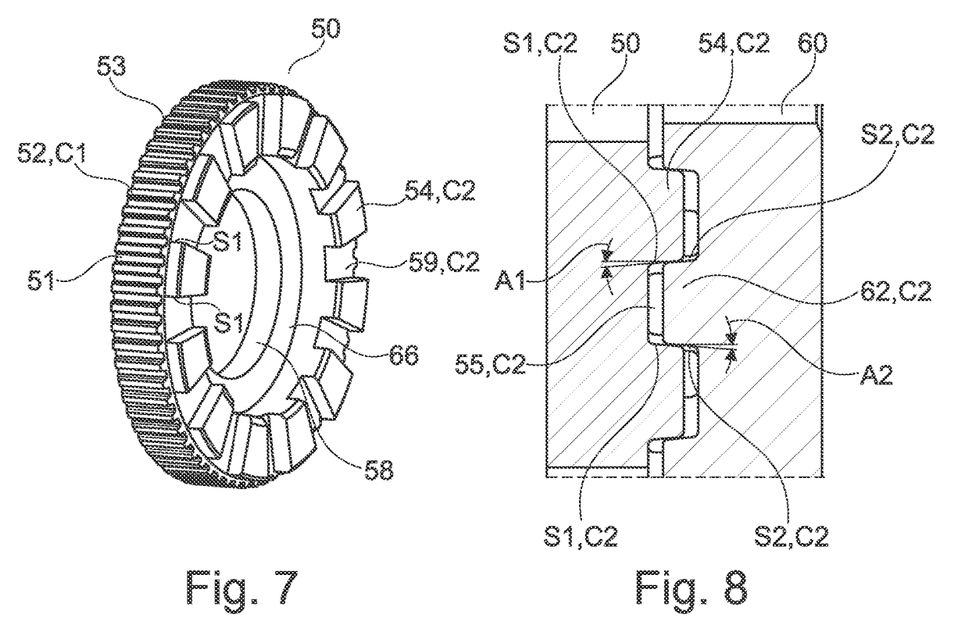
FIG. 7 is a perspective view of a clutch piston of the disconnect unit of FIG. 1.
FIG. 8 is a cross-sectional view of the clutch piston engaging the clutch ring in a first connected position of the disconnect unit.
Figure 9:
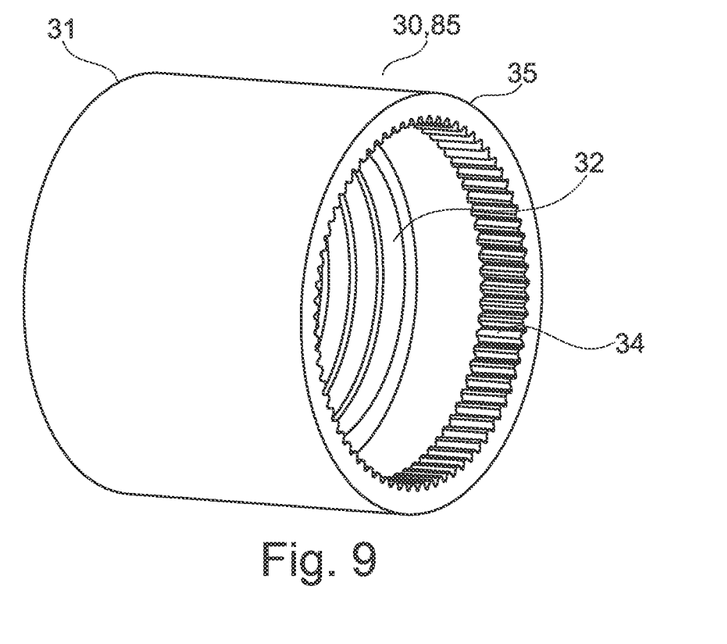
FIG. 9 is a perspective view of a nut of the disconnect unit of FIG. 1.
Figure 10:
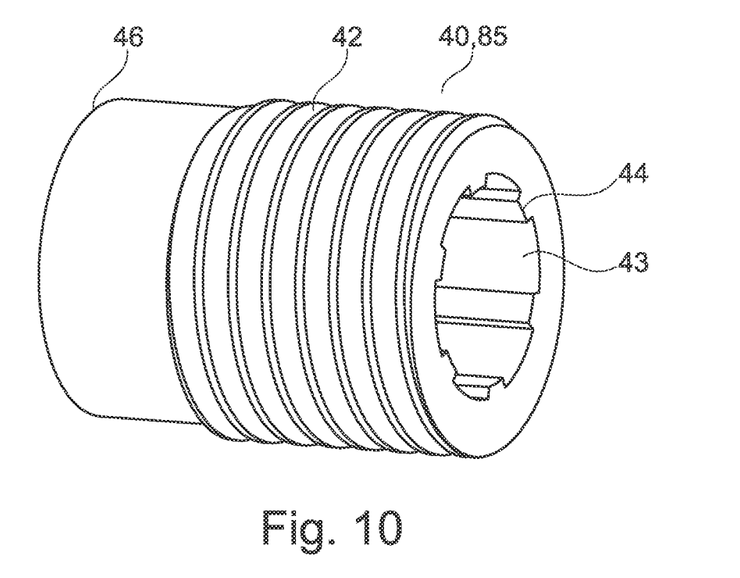
FIG. 10 is a perspective view of a screw of the disconnect unit of FIG. 1.
Figure 11:
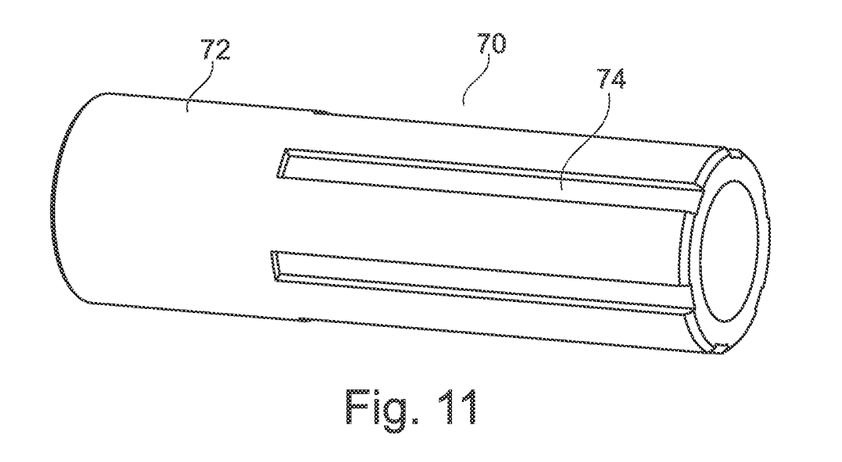
FIG. 11 is a perspective view of a post of the disconnect unit of FIG. 1.
Figure 12A:
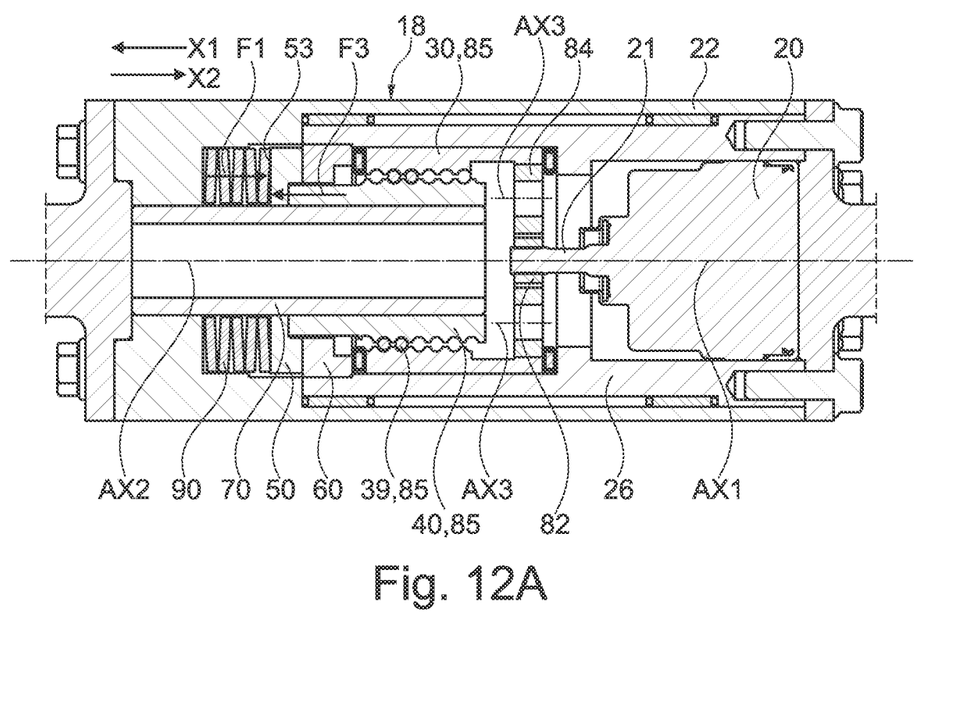
FIG. 12A is a cross-sectional view taken from FIG. 1 that shows the stabilizer bar in the first connected position.
Figure 12B:
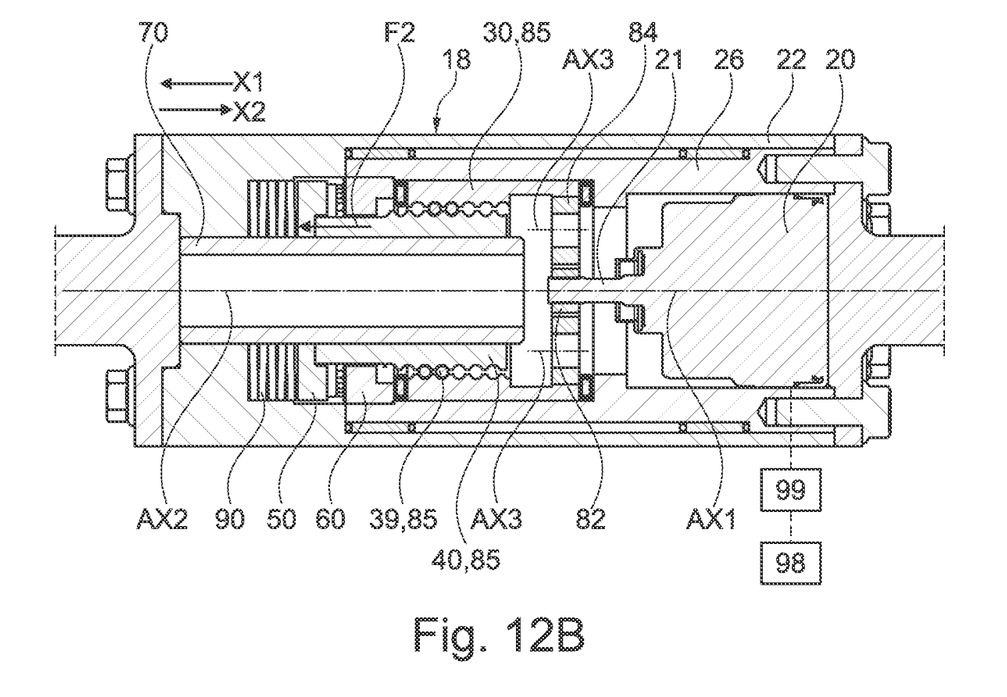
FIG. 12B is a cross-sectional view taken from FIG. 1 that shows the stabilizer bar in a second disconnected position.

FIG. 1 shows a perspective view of an exemplary embodiment of a vehicle stabilizer bar 100 with a disconnect unit 18. FIG. 2 shows a perspective cross-sectional view taken from FIG. 1. FIG. 3 shows an exploded perspective view of the disconnect unit 18. FIG. 4A shows a perspective view of an exemplary first housing 22 of the disconnect unit 18. FIG. 4B shows a perspective cross-sectional view taken from FIG. 4A. FIG. 5A shows a perspective view of a second housing 26 of the disconnect unit 18. FIG. 5B shows a perspective cross-sectional view taken from FIG. 5A. FIGS. 6A and 6B show perspective views of a clutch ring 60. FIG. 7 shows a perspective view of a clutch piston 50 of the disconnect unit 18. FIG. 8 shows a cross-sectional view of the clutch piston 50 engaging the clutch ring 60 in a first connected position of the disconnect unit 18. FIG. 9 shows a perspective view of a nut 30 of the disconnect unit 18. FIG. 10 shows a perspective view of a screw 40 of the disconnect unit 18. FIG. 11 shows a perspective view of a post 70 of the disconnect unit 18. FIG. 12A is a cross-sectional view taken from FIG. 1 that shows the vehicle stabilizer bar 100 in the first connected position. FIG. 12B is a cross-sectional view taken from FIG. 1 that shows the vehicle stabilizer bar 100 in a second disconnected position. The following discussion should be read in light of FIGS. 1 through 12B.

The vehicle stabilizer bar 100 includes a left side-bar 12 and a right side-bar 14. An outboard end 13 of the left side-bar 12 is connected to a left wheel suspension (not shown). Similarly, an outboard end 15 of the right side-bar 14 is connected to a right wheel suspension (not shown). The vehicle stabilizer bar 100 is connected to the vehicle frame or body (not shown) by mounting bushings (not shown) that support straight portions 16, 17 of the respective left and right side-bars 12, 14. The disconnect unit 18 selectively connects and disconnects the left and right side-bars 12, 14 to one another torsionally. When the vehicle stabilizer bar 100 is in the first connected position or state, vertical displacement of one of the vehicle wheels imposes a torque on the corresponding side-bar. That torque is transmitted to the opposite side-bar and tends to displace the opposite wheel vertically in the same direction, resisting a tendency of the vehicle to tip when rounding a corner. When the vehicle stabilizer bar 100 is in the second disconnected position or state, no torque is transmitted via the stabilizer bar 100. The second disconnected position enables each wheel to displace vertically without impacting vertical displacement of the other wheel.

The disconnect unit 18 includes the first housing 22 which, in the exemplary embodiment described and shown herein, houses or circumferentially surrounds all the components of the disconnect unit 18; therefore, the first housing 22 could be described as an outer housing. The first housing 22 includes a through-bore 23 with a first bore segment 24A, a second bore segment 24B, a third bore segment 24C, and a fourth bore segment 24D.

The second housing 26 is disposed within the first housing 22; particularly, the second housing 26 is disposed within the fifth bore segment 24E of the first housing 22. In the second disconnected position or state of the disconnect unit 18, the second housing 26 is rotatable relative to the first housing 22. To facilitate this relative rotational movement in a low friction manner, radial roller bearings 94A, 94B are arranged within the fifth bore segment 24E of the first housing 22 to support the second housing 26. The radial roller bearings 94A, 94B roll on a radial inner surface 25 of the fifth bore segment 24E.

The second housing 26 includes a through-bore 28 with a first bore segment 29A, a second bore segment 29B, a third bore segment 29C, and a fourth bore segment 29D. The first bore segment 29A defines a diameter D1 and the second bore segment 29B defines a diameter D2 that is less than the diameter D1. The third bore segment 29C is defined by a diameter D3 that is the smallest amongst the four bore segments. The third bore segment 29C is also defined by a radially inwardly protruding rib 37. It could be stated that the second housing 26 is entirely disposed within the first housing 22, although such a relationship is not a necessity for the functionality of the disconnect unit 18. Given this relationship, any component that is housed by the second housing 26 is also housed by the first housing 22.

FIG. 12A shows the vehicle stabilizer bar 100, or the disconnect unit 18 of the vehicle stabilizer bar 100, in the first connected position. The left side-bar 12 is fixed to the first housing 22 via fasteners 88 and the right side-bar 14 is fixed to the second housing 26 via fasteners 89. In the first connected position, the clutch piston 50 is forcibly engaged with and torsionally coupled to the clutch ring 60 via a force generator 90 or spring that is housed within the third and fourth bore segments 24C, 24D of the first housing 22. Therefore, the left side-bar 12 is torsionally coupled to the right side-bar 14 and no relative rotation occurs between the first housing 22 and the second housing 26.

A disconnect unit powertrain 86 is contained or housed within the second, third, and fourth segments 29B, 29C, 29D of the second housing 26 and includes an actuator 20 and a planetary gearset 80. The actuator 20 can be an electric motor, as shown in the figures, or any other suitable actuating device.

Referring to FIG. 12B, a sun gear 82 of the planetary gearset 80 is fixed to a shaft 21 of the actuator 20 or electric motor. Rotation of the shaft 21 and sun gear 82, via energization of the electric motor, causes planet gears 84 to rotate around their individual axes AX3 which induces rotation of the nut 30. The energization of the electric motor is accomplished via an electrical connector 36 (FIG. 3), which connects the electric motor to an electronic control unit 99 and a power source 98, such as a battery. Selective energization of the electric motor can be controlled or managed by the electronic control unit 99. In order to torsionally uncouple the left side-bar 12 to the right side-bar 14, the actuator 20 is energized to rotate the nut 30 of a screw assembly 85 which moves the screw 40 in a first direction X1 so that the clutch piston 50 moves away from the clutch ring 60 and disengages and torsionally uncouples from the clutch ring 60. The nut 30 includes an integrated internal gear 34 and is drivably connected to the screw 40 via internal threads 32 (FIG. 9). The planet gears 84 of the planetary gearset 80 are drivably connected to the internal gear 34 such that rotation of the planet gears 84 causes rotation of the nut 30. The internal threads 32 are drivably connected to the external threads 42 arranged on the screw 40 via the balls 39. The screw assembly 85 includes the nut 30, the balls 39, and the screw 40. Other screw assembly variations, such as those without the balls 39, are also possible. Furthermore, other suitable means of translating rotational movement of the actuator 20 to linear movement of the clutch ring 60 could also be utilized.

The nut 30 does not move axially relative to the second housing 26. Thrust or axial loads that occur on the nut 30 due to movement of the screw 40 in either the first direction X1 or a second direction X2 are supported by a respective first thrust roller bearing 96A and a second thrust roller bearing 96B. The first thrust roller bearing 96A is arranged between a first threaded end 31 of the nut 30 and a second axial end face 64 of the clutch ring 60. The second thrust roller bearing 96B is arranged between a second geared end 35 of the nut 30 and the rib 37 of the second housing 26.

A post 70 is fixed to the second bore segment 24B of the first housing 22 via a press-fit or any other suitable fixing means. The screw 40 slides linearly in either the first direction X1 or the second direction X2 on a radial outer surface 72 of the post 70 via a longitudinal through-bore 43. The through-bore 43 includes radial protrusions 44 that extend radially inwardly and slidably engage circumferentially arranged grooves 74 arranged on the radial outer surface 72 of the post 70. Other suitable means of preventing rotation of the screw 40 are also possible.

The clutch piston 50 can be fixed axially and rotationally to an end 46 of the screw 40. The end 46 of the screw can be press-fit into a recess 66 of the clutch piston 50, but other suitable attachment methods are also possible. The clutch piston 50 includes a through-bore 58 through which the post 70 extends. A first axial end face 53 of the clutch piston 50 is loaded via a force provided by the force generator 90. In an example embodiment, the clutch piston 50 is not fixed to the end 46 of the screw 40 because the clutch piston 50 is held against the end 46 of the screw 40 in any axial position (and in both directions of axial movement) via the inherent loading of the force generator 90 and the screw assembly 85. Therefore, it could be stated that the screw 40 is coupled to the clutch piston 50, meaning that when the screw 40 moves axially in either direction, the clutch piston 50 moves together with the screw 40 or in unison with the screw 40, regardless of the fitment or type of connection (fixed or not fixed) between these two components.

The clutch piston 50 and the first housing 22 define a first torsional coupling C1. The first torsional coupling C1 includes an array of slots 57 or depressions arranged on a radial inner surface 56 of the fourth bore segment 24D of the first housing 22, defining a first portion of the first torsional coupling C1, and an array or group of radial protrusions 52 arranged on a radial outer surface 51 of the clutch piston 50, defining a second portion of the first torsional coupling C1, that slidably engage the slots 57. The radial protrusions 52 could also be described as a circumferential array of teeth or outcroppings that define a radial outer-most surface of the clutch piston 50. The first torsional coupling C1 continuously torsionally couples the clutch piston 50 to the first housing 22 in any axial position of the clutch piston 50. Other suitable forms of the first torsional coupling C1 are also possible other than what is described here and shown in the figures.

The clutch piston 50 and the clutch ring 60 define a second torsional coupling C2. The clutch piston 50 includes an array or group of axial protrusions 54 or teeth arranged on a second axial end face 59 of the clutch piston 50. Each axially extending side S1 or surface of the axial protrusions 54 can be tapered or angled toward each other, defining an angle A1. Two successive axial protrusions 54 form a depression 55 defined by the second axial end face 59 that includes the axially extending sides S1. It could be stated that each axial protrusion 54 is separated by a depression 55 or that the axial protrusions 54 and depressions 55 are arranged in an alternating pattern around the second axial end face 59 of the clutch piston 50. The axial protrusions 54, depressions 55, second axial end face 59, and the corresponding sides S1 or surfaces define a first portion of the second torsional coupling C2.

The clutch ring 60 is axially and rotationally fixed to an actuating end 27 of the second housing 26. As shown, a radial outer surface of the clutch ring 60 is press-fit into the first segment of the second housing 26 or any other suitable attachment method including, but not limited to, welding (frictional or other) or fastening. The clutch ring 60 includes an array or group of axial protrusions 62 or teeth arranged on a first axial end face 61. Each axially extending side S2 or surface of the axial protrusions can be tapered or angled toward each other, defining an angle A2, which may or may not be the same as the previously described angle A1 of the clutch piston 50 axial protrusions 54. Two successive axial protrusions 62 form a depression 63 defined by the first axial end face 61 that includes the axially extending sides S2. It could be stated that each axial protrusion 62 is separated by a depression 63 or that the axial protrusions 62 and depressions 63 are arranged in an alternating pattern around the first axial end face 61 of the clutch ring 60. The axial protrusions 62, depressions 63, first axial end face 61, and the corresponding sides S2 or surfaces define a second portion of the second torsional coupling C2.

To achieve the first connected position or state of the disconnect unit 18 shown in FIG. 12A, the actuator 20 can be de-energized and a force F1 of the force generator 90 acts on the first axial end face 53 of the clutch piston 50 so that it moves in the second direction X2. In an example embodiment, this de-energized first connected position is the default state of the disconnect unit 18. Axial movement of the clutch piston 50 causes the axial protrusions 54 of the clutch piston 50 to mesh with the depressions 63 of the clutch ring 60, and the axial protrusions 62 of the clutch ring 60 to mesh with the depressions 55 of the clutch piston 50. The force F1 of the force generator 90 can overcome a friction force F3 of the screw assembly. Therefore, in an example embodiment, the actuator 20 does not need to rotate the nut 30 to retract the screw in the second direction X2 since the force F1 can alone induce rotation of the nut 30. In a further example embodiment, the actuator rotates the nut 30 to retract the screw. The term "mesh" signifies a torsional coupling or interlocking of the axial protrusions 54, 62 and corresponding depressions 63, 55, similar to that of a dog clutch. In the first connected position, the sides S1 of the axial protrusions 54 of the clutch piston 50 are circumferentially adjacent to and engaged with the sides S2 of the axial protrusions 62 of the clutch ring 60. In an example embodiment, the axial protrusions 54 of the clutch piston 50 engage the axial end face 61 of the clutch ring 60 in the first connected position. Alternatively, in a further example embodiment, the axial protrusions 62 of the clutch ring 60 engage the second axial end face 59 of the clutch piston 50 in the first connected position.

FIG. 12A shows axes AX1 and AX2. The first axis AX1 is a rotational axis for the shaft 21 of the electric motor (actuator 20). The second axis AX2 is an actuation axis for the screw 40 and the clutch piston 50. As shown, the first axis AX1 is aligned with the second axis AX2, however in an example embodiment, the actuator 20 is not aligned with the second axis AX2, which could be facilitated by any other powertrain drive such as an offset gearbox or a drive that utilizes sprockets or pulleys and a corresponding belt or chain. It could be stated that the first axis AX1 serves as a rotational axis for the sun gear 82 of the planetary gearset 80 and the nut 30; or, given the previously described "aligned" configuration, one continuous axis that spans a length of the disconnect unit 18 could serve as both a rotational axis and a translational axis for the disconnect unit 18.

It is evident from FIGS. 12A and 12B that the screw 40 and the clutch piston have a first axial position while in the first connected position and a second axial position that is different than the first axial position while in the second disconnected position. Compared to the first axial position of the first connected position, the second axial position of the second disconnected position is shifted axially to the left relative to the post 70 and the first and second housings 22, 26.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle stabilizer bar comprising:
a first housing configured to be fixed to a first side-bar, the first housing defining a first portion of a first coupling;
a second housing configured to be fixed to a second side-bar, the second housing disposed within the first housing;
a clutch piston disposed within the first housing, the clutch piston defining:
a second portion of the first coupling configured to cooperate with the first portion of the first coupling, such that the first coupling: i) torsionally couples the clutch piston to the first housing, and ii) provides for axial movement between the clutch piston and the first housing; and
a first portion of a second coupling;
a clutch ring fixed to the second housing, the clutch ring defining a second portion of the second coupling, the second portion of the second coupling configured to cooperate with the first portion of the second coupling to selectively torsionally couple the first housing to the second housing; and
a screw assembly having:
a screw coupled to the clutch piston; and
a nut disposed within the second housing and drivably connected to the screw; and
an actuator configured to rotate the nut so that the screw moves axially to selectively move the clutch piston from a first connected position, in which the clutch piston is torsionally coupled to the clutch ring, to a second disconnected position, in which the clutch piston is torsionally uncoupled from the clutch ring.

2. The vehicle stabilizer bar of claim 1, wherein the first coupling continuously torsionally couples the first housing to the clutch piston.

3. The vehicle stabilizer bar of claim 1, wherein the screw moves axially along an actuation axis without rotating about the actuation axis.

4. The vehicle stabilizer bar of claim 1, wherein the first portion of the second coupling comprises an array of protrusions arranged on an axial face of the clutch piston, and the second portion of the second coupling comprises an array of depressions arranged on an axial face of the clutch ring, the array of depressions configured to receive the array of protrusions.

5. The vehicle stabilizer bar of claim 1, wherein the actuator is disposed within the second housing.

6. The vehicle stabilizer bar of claim 5, further comprising a gearset disposed within the second housing, and the actuator is drivably connected to the nut via the gearset.

7. The vehicle stabilizer bar of claim 6, wherein the gearset engages an internal gear of the nut.

8. The vehicle stabilizer bar of claim 6, wherein the gearset is a planetary gearset.

9. The vehicle stabilizer bar of claim 8, wherein the actuator is an electric motor.

10. The vehicle stabilizer bar of claim 9, wherein an output shaft of the electric motor is concentric with the nut.

11. The vehicle stabilizer bar of claim 9, wherein an output shaft of the electric motor is fixed to a sun gear of the planetary gearset.

12. A vehicle stabilizer bar comprising:
a first housing configured to be fixed to a first side-bar, the first housing having:
an axially movable clutch piston torsionally attached to the first housing;
a force generator configured to forcibly engage the axially movable clutch piston;
a second housing configured to be fixed to a second side-bar, the second housing having:
a clutch ring fixed to an actuating end of the second housing;
a nut:
arranged in a fixed axial position within the second housing; and
configured to rotate relative to the second housing;
a screw configured to move axially via rotation of the nut; and in a first connected position, the axially movable clutch piston is torsionally coupled with the clutch ring via a first axial position of the screw; and in a second disconnected position, the axially movable clutch piston is torsionally uncoupled with the clutch ring via a second axial position of the screw.

13. The vehicle stabilizer bar of claim 12, wherein the screw is configured to move axially along an actuation axis without rotating about the actuation axis.

14. The vehicle stabilizer bar of claim 12, wherein the nut is drivably connected to the screw via a plurality of balls.

15. The vehicle stabilizer bar of claim 12, wherein an end of the nut includes an internal gear configured to be driven by an actuator.

16. The vehicle stabilizer bar of claim 12, wherein in the second disconnected position, the second housing rollably engages the first housing.

17. The vehicle stabilizer bar of claim 12, further comprises an actuator disposed within the second housing, the actuator configured to rotate the nut.

18. A vehicle stabilizer bar comprising:
a first housing configured to be fixed to a first side-bar, the first housing having an axially movable clutch piston;
a second housing configured to be fixed to a second side-bar, the second housing configured to be selectively torsionally coupled to the first housing via the axially movable clutch piston;
a clutch ring disposed within the first housing and the second housing, the clutch ring configured to be selectively torsionally coupled to the clutch piston;
a screw assembly having:
a nut disposed within the first housing and the second housing;
a screw:
disposed within the first housing and the second housing;
configured to move axially via rotation of the nut; and
coupled to the clutch piston; and
in a first connected position, the clutch piston is torsionally coupled with the clutch ring; and
in a second disconnected position, the clutch piston is torsionally uncoupled with the clutch ring.

19. The vehicle stabilizer bar of claim 18, further comprising an actuator disposed within the first housing and the second housing, the actuator configured to rotate the nut.

20. The vehicle stabilizer bar of claim 19, further comprising a gearset disposed within the first housing and the second housing, and the actuator is drivably connected to the nut via the gearset.

\* \* \* \* \*